United States Patent
Xia et al.

(10) Patent No.: US 10,631,659 B2
(45) Date of Patent: Apr. 28, 2020

(54) INFLATABLE PRODUCT AND INFLATABLE PRODUCT FUSING PROCESS

(71) Applicant: Zhejiang Natural Outdoor Goods Inc., Zhejiang (CN)

(72) Inventors: Yonghui Xia, Zhejiang (CN); Jinglong Cao, Zhejiang (CN)

(73) Assignee: Zhejiang Natural Outdoor Goods Inc (CN)

( * ) Notice: Subject to any disclaimer, the term of this patent is extended or adjusted under 35 U.S.C. 154(b) by 680 days.

(21) Appl. No.: 15/164,027

(22) Filed: May 25, 2016

(65) Prior Publication Data
US 2017/0238718 A1 Aug. 24, 2017

(30) Foreign Application Priority Data
Feb. 23, 2016 (CN) .......................... 2016 1 0099654

(51) Int. Cl.
*A47C 27/08* (2006.01)
*B29C 65/04* (2006.01)
*A47C 4/54* (2006.01)
*B29L 22/00* (2006.01)

(52) U.S. Cl.
CPC .............. *A47C 27/087* (2013.01); *A47C 4/54* (2013.01); *B29C 65/04* (2013.01); *B29L 2022/005* (2013.01)

(58) Field of Classification Search
CPC ....... A47C 27/087; A47C 27/121; A47C 4/54; B29C 65/04
See application file for complete search history.

(56) References Cited

U.S. PATENT DOCUMENTS

| 272,116 | A | * | 2/1883 | Blochman | ............ | A47C 27/081 |
| | | | | | | 5/712 |
| 3,683,431 | A | * | 8/1972 | Pennel | ................. | A47C 27/081 |
| | | | | | | 5/712 |
| 3,705,429 | A | * | 12/1972 | Nail | ...................... | A47C 27/081 |
| | | | | | | 5/710 |
| 4,092,750 | A | * | 6/1978 | Ellis | ..................... | A47C 27/081 |
| | | | | | | 5/413 AM |

(Continued)

*Primary Examiner* — Nicholas F Polito
*Assistant Examiner* — Alexis Felix Lopez
(74) *Attorney, Agent, or Firm* — Harness, Dickey & Pierce, P.L.C.

(57) ABSTRACT

Provided are an inflatable product and an inflatable product fusing process. The inflatable product comprises an upper sheet, a lower sheet, pull straps provided therebetween, and upper and lower fixing sheets having one faces away from each other respectively joined with inner surfaces of the upper and lower sheets and one faces facing towards each other not joined. The pull strap has oppositely-provided upper and lower pull strap sheets of porous material. The upper sheet, upper pull strap sheet, upper fixing sheet, lower fixing sheet, lower pull strap sheet and lower sheet are successively provided. When processing using a hot-fusing machine or high-frequency machine, the upper and lower pull strap sheets are simultaneously jointed with the upper and lower fixing sheets, therefore the inflatable product can be one-step formed and no separating sheet needs to be provided in the pull strap, thus simplifying manufacturing process and improving production efficiency.

4 Claims, 6 Drawing Sheets

(56) References Cited

U.S. PATENT DOCUMENTS

| | | | | |
|---|---|---|---|---|
| 4,141,770 A * | 2/1979 | Mollura | A47C 27/085 | 156/218 |
| 5,608,931 A * | 3/1997 | Gancy | A47C 27/081 | 5/711 |
| 5,906,019 A * | 5/1999 | McCarthy | A47C 27/087 | 5/706 |
| 5,960,495 A * | 10/1999 | Hsu | A47C 27/087 | 5/706 |
| 6,775,868 B1 * | 8/2004 | Mileti | A47C 27/001 | 5/710 |
| 7,089,618 B1 * | 8/2006 | Metzger | A47C 27/081 | 5/709 |
| 7,467,496 B1 * | 12/2008 | Cuisset | E04H 15/20 | 52/2.18 |
| 9,185,992 B2 * | 11/2015 | Lau | A47C 27/081 | |
| 9,949,572 B2 * | 4/2018 | Ocegueda Gallaga | A47C 27/087 | |
| 2003/0024050 A1 * | 2/2003 | Boso | A47C 27/082 | 5/711 |
| 2003/0188388 A1 * | 10/2003 | Boso | A47C 27/082 | 5/710 |
| 2004/0074004 A1 * | 4/2004 | Boso | A47C 27/082 | 5/710 |
| 2005/0223495 A1 * | 10/2005 | Wu | A47C 27/081 | 5/711 |
| 2007/0033739 A1 * | 2/2007 | Austen | A47C 27/081 | 5/712 |
| 2007/0044243 A1 * | 3/2007 | Metzger | A47C 27/081 | 5/712 |
| 2007/0124864 A1 * | 6/2007 | Lau | A47C 27/081 | 5/711 |
| 2007/0283499 A1 * | 12/2007 | Lin | A47C 27/081 | 5/712 |
| 2008/0105366 A1 * | 5/2008 | Wang | A47C 27/081 | 156/219 |
| 2008/0148489 A1 * | 6/2008 | Wu | A47C 27/081 | 5/712 |
| 2009/0136718 A1 * | 5/2009 | Dacey | A47C 27/081 | 428/188 |
| 2009/0165211 A1 * | 7/2009 | Song | A47C 27/081 | 5/706 |
| 2009/0320211 A1 * | 12/2009 | Lau | A47C 27/081 | 5/713 |
| 2011/0191961 A1 * | 8/2011 | Wu | A47C 27/081 | 5/711 |
| 2012/0000017 A1 * | 1/2012 | Xia | A47C 27/081 | 5/706 |
| 2012/0031265 A1 * | 2/2012 | Song | A47C 27/081 | 92/145 |
| 2013/0145560 A1 * | 6/2013 | Chen | A47C 27/082 | 5/711 |
| 2013/0180052 A1 * | 7/2013 | Chen | A47C 27/081 | 5/711 |
| 2013/0228268 A1 * | 9/2013 | Lin | A47C 27/081 | 156/166 |
| 2014/0237727 A1 * | 8/2014 | Xia | A47C 27/081 | 5/711 |
| 2014/0265485 A1 * | 9/2014 | Wang | A47C 27/087 | 297/232 |
| 2015/0096126 A1 * | 4/2015 | Chai | A47C 27/081 | 5/706 |
| 2015/0147503 A1 * | 5/2015 | Lin | B32B 7/12 | 428/35.7 |
| 2015/0157133 A1 * | 6/2015 | Lau | A47C 27/081 | 5/706 |
| 2015/0201760 A1 * | 7/2015 | Lin | A47C 27/087 | 5/710 |
| 2015/0335164 A1 * | 11/2015 | Liu | A47C 27/081 | 428/12 |
| 2016/0120331 A1 * | 5/2016 | Wang | A47C 27/087 | 5/694 |
| 2016/0331148 A1 * | 11/2016 | Ocegueda Gallaga | A47C 27/087 | |
| 2016/0331149 A1 * | 11/2016 | Ocegueda Gallaga | A47C 27/087 | |
| 2017/0196368 A1 * | 7/2017 | Liu | A47C 27/081 | |
| 2017/0238718 A1 * | 8/2017 | Xia | A47C 27/087 | |
| 2017/0273472 A1 * | 9/2017 | Liu | A47C 27/081 | |

* cited by examiner

INFLATABLE PRODUCT AND INFLATABLE PRODUCT FUSING PROCESS

CROSS-REFERENCE TO RELATED APPLICATIONS

This application claims the benefit of Chinese Patent Application No. 201610099654.3, filed on Feb. 23, 2016. The disclosure of the prior application is hereby incorporated by reference herein in its entirety.

TECHNICAL FIELD

The present invention relates to the technical field of inflatable products, and particularly to an inflatable product and an inflatable product fusing process.

BACKGROUND ART

Inflatable products, such as inflatable beds, inflatable sofas and like useful products, are widely used due to characteristics of light weight, portability, easy storage and so on. The inflatable product realizes the shaping and soft support of the product mainly by all-around welding of a plurality of plastic sheet bodies to form one inflatable chamber, and when it is to configure the inflatable product into a predetermined shape, it has to be realized by fuse-connecting its internal pull straps and peripheral sheets of the inflatable product. The inflatable bed, if having no the pull strap structure inside, is likely to become a balloon. In order to keep the inflatable bed be a cuboid, it is required to internally provide pull straps or air columns for traction so as to tightly stretch an upper surface and a lower surface of the inflatable bed. Moreover, the smoother the bed surface is, the more the number of the pull straps provided inside the inflatable bed is.

In the conventional inflatable product such as the inflatable bed, a plurality of pull straps and an upper sheet and a lower sheet of a bed body are connected through a process of connecting one sheet with another, and its specific manufacturing steps include: firstly placing the upper sheet of the bed body into an aluminum frame (material placing frame); placing an integrated fusing plate (aluminum plate) as marked; then spreading one ends of the pull straps on the upper sheet and the fusing plate; pushing the aluminum frame below a high-frequency machine to fuse the upper sheet and the one ends of the pull straps; next, pulling out the aluminum frame and placing the lower sheet; placing the aluminum fusing sheet as marked, and spreading the other ends of the pull straps on the lower sheet and the fusing sheet; then pushing the aluminum frame below the high-frequency machine to fuse the lower sheet and the pull straps. The whole procedure of connecting the pull straps includes two fusing processes, therefore the conventional inflatable product fusing process is tedious and slowly operated for a long period of time, with a low efficiency.

SUMMARY OF THE INVENTION

An object of the present invention is to provide an inflatable product and an inflatable product fusing process, so as to address the technical problems of the inflatable product fusing process being tedious and low-efficiency in the prior art.

The present invention provides an inflatable product, comprising an upper sheet, a lower sheet, pull straps, upper fixing sheets and lower fixing sheets, wherein the pull straps are provided between the upper sheet and the lower sheet, the pull strap has an upper pull strap sheet and a lower pull strap sheet which are oppositely provided, and the upper pull strap sheet and the lower pull strap sheet are made from a porous material;

the upper sheet, the upper pull strap sheet, the upper fixing sheet, the lower fixing sheet, the lower pull strap sheet and the lower sheet are successively provided, one face of the upper fixing sheet and one face of the lower fixing sheet, which are away from each other, are respectively joined with an inner surface of the upper sheet and an inner surface of the lower sheet, and one face of the upper fixing sheet and one face of the lower fixing sheet, which face towards each other, are not joined.

Further, the joining manner between the upper fixing sheet and the upper sheet is point joining, line joining or face joining;

and/or, the joining manner between the lower fixing sheet and the lower sheet is point joining, line joining or face joining.

Further, there are a plurality of the upper fixing sheets and/or the lower fixing sheets, and the plurality of the upper fixing sheets and/or the plurality of the lower fixing sheets are arranged at intervals.

Further, the upper fixing sheet and/or the lower fixing sheet comprise a cover layer and a bonding layer fixedly connected on the cover layer.

Further, a material of the bonding layer is TPE, TPU, TPR, TPV, PVC, TPO, TPVC, TPVE, EVA or glue.

Further, a material of the cover layer is a cloth.

Further, there are a plurality of pull straps, and the plurality of pull straps are arranged at intervals.

The present invention further provides an inflatable product fusing process, comprising steps of:

placing an upper sheet of an inflatable product;

placing pull straps on the upper sheet, wherein the pull strap has an upper pull strap sheet and a lower pull strap sheet which are oppositely provided, and the upper pull strap sheet and the lower pull strap sheet are made from a porous material; an upper fixing sheet and a lower fixing sheet are provided between the upper pull strap sheet and the lower pull strap sheet, one face of the upper fixing sheet and one face of the lower fixing sheet, which are away from each other, are respectively joined with the upper sheet and a lower sheet, and one face of the upper fixing sheet and one face of the lower fixing sheet, which face towards each other, are not joined;

placing the lower sheet of the inflatable product on the pull straps;

performing a hot fusing or high-frequency operation, to fuse the upper pull strap sheets with the upper fixing sheets and the lower fixing sheets with the lower pull strap sheets together at the same time.

Further, the upper fixing sheet and the lower fixing sheet are placed in a mesh cloth, and then the mesh cloth is folded in half to form an annular pull strap.

Further, the mesh cloth, after being folded in half, forms a C-shaped pull strap, and then the upper fixing sheet and the lower fixing sheet are placed in the pull strap.

The inflatable product provided in the present invention comprises the upper sheet, the lower sheet, the pull straps, the upper fixing sheets and the lower fixing sheets, wherein the pull strap has the upper pull strap sheet and the lower pull strap sheet which are oppositely provided, and the upper pull strap sheet and the lower pull strap sheet are made from a porous material, to make the weight of the pull strap very light, so that the weight of the inflatable product is greatly reduced, thus facilitating use. Besides, in the present invention, by providing the upper fixing sheet and the lower fixing sheet in the pull strap, wherein one face of the upper fixing sheet and one face of the lower fixing sheet, which are away from each other, are respectively joined with the inner surface of the upper sheet and the inner surface of the lower sheet, and one face of the upper fixing sheet and one face of the lower fixing sheet, which face towards each other, are not joined, when a hot fusing machine or a high-frequency machine is used for processing, the upper pull strap sheet and the upper fixing sheet, and the lower fixing sheet and the lower pull strap sheet can be joined at the same time, that is to say, the inflatable product provided in the present invention can be formed in one step, and no separating sheet needs to be provided in the pull strap, thus simplifying the manufacturing process and improving the production efficiency.

The inflatable product fusing process provided in the present invention comprises the following steps: placing an upper sheet of an inflatable product; placing pull straps on the upper sheet, wherein the pull strap has an upper pull strap sheet and a lower pull strap sheet which are oppositely provided, and the upper pull strap sheet and the lower pull strap sheet are made from a porous material; an upper fixing sheet and a lower fixing sheet are provided between the upper pull strap sheet and the lower pull strap sheet, one face of the upper fixing sheet and one face of the lower fixing sheet, which are away from each other, are respectively joined with the upper sheet and a lower sheet, and one face of the upper fixing sheet and one face of the lower fixing sheet, which face towards each other, are not joined; placing the lower sheet of the inflatable product on the pull strap; performing a hot fusing or high-frequency operation, to fuse the upper pull strap sheets with the upper fixing sheets and the lower fixing sheets with the lower pull strap sheet together at the same time. The inflatable product fusing process can fuse the upper pull strap sheets with the upper fixing sheets, and fuse the lower fixing sheets with the lower pull strap sheets together at the same time through one hot fusing or high-frequency operation, and no separating sheet needs to be provided in the pull strap, thus simplifying the manufacturing process and improving the production efficiency.

BRIEF DESCRIPTION OF DRAWINGS

In order to more clearly illustrate technical solutions of specific embodiments of the present invention or the prior art, figures which are needed for description of the specific embodiments or the prior art will be introduced briefly below. Apparently, the figures in the description below show some embodiments of the present invention, and a person ordinarily skilled in the art still can obtain other figures according to these figures, without paying inventive efforts.

DETAILED DESCRIPTION OF EMBODIMENTS

Below, the technical solutions of the present invention will be described clearly and completely in conjunction with figures. Apparently, the described examples are some but not all examples of the present invention. Based on the examples of the present invention, all the other examples, which a person ordinarily skilled in the art obtains without paying inventive efforts, fall within the scope of protection of the present invention.

In the description of the present invention, it should be indicated that orientational or positional relationships indicated by terms such as "center", "upper", "lower", "left", "right", "vertical", "horizontal", "inner", and "outer" are based on orientational or positional relationships as shown in the figures, merely for facilitating describing the present invention and simplifying the description, rather than indicating or suggesting that related devices or elements have to be in the specific orientation or configured and operated in specific orientation, therefore they should not be construed as limiting the present invention. Besides, terms "first", "second", and "third" are used merely for descriptive purpose, but should not be understood as indicating or suggesting to have importance in relativity, wherein terms "first position" and "second position" are two different positions.

In the description of the present invention, it should be indicated that unless otherwise expressly specified and defined, terms "installation", "join", and "connection" should be understood widely, for example, it may be a fixed connection, a detachable connection, or an integrated connection; it may be a mechanical connection, or an electrical connection; it may be a direct connection, or an indirect connection through an intermediate medium; and it also may be an inner communication between two elements. For a person ordinarily skilled in the art, the specific meanings of the above-mentioned terms in the present invention can be understood according specific circumstances.

Figure 1:
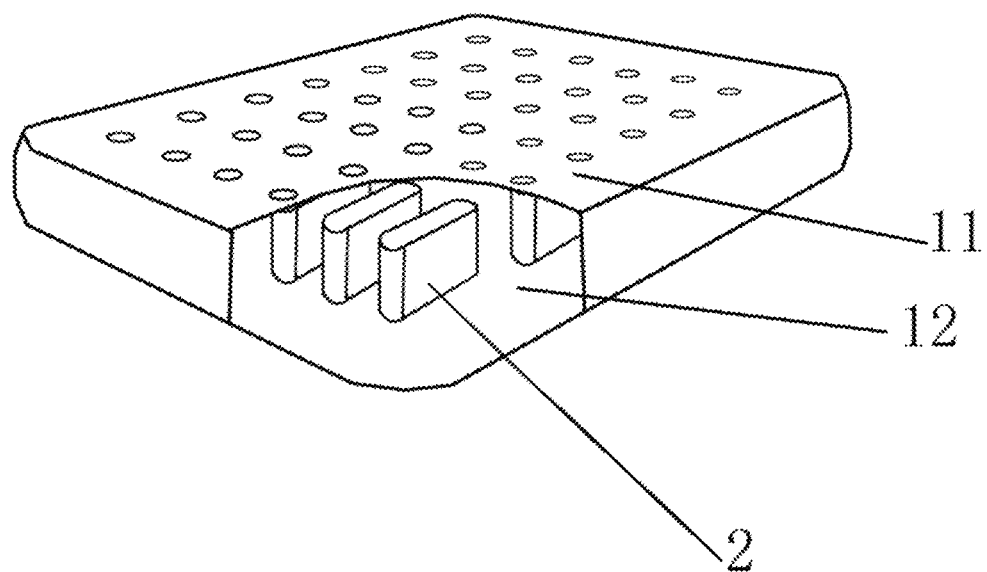
FIG. 1 is a perspective view of an inflatable product provided in an example of the present invention.
Figure 2:
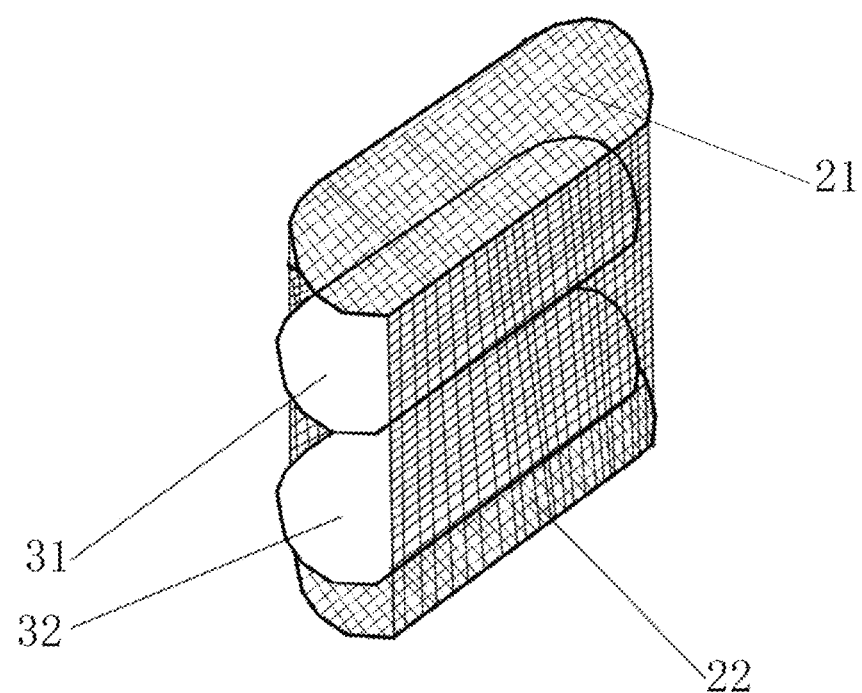
FIG. 2 is a perspective view of a pull strap in FIG. 1.
Figure 3:
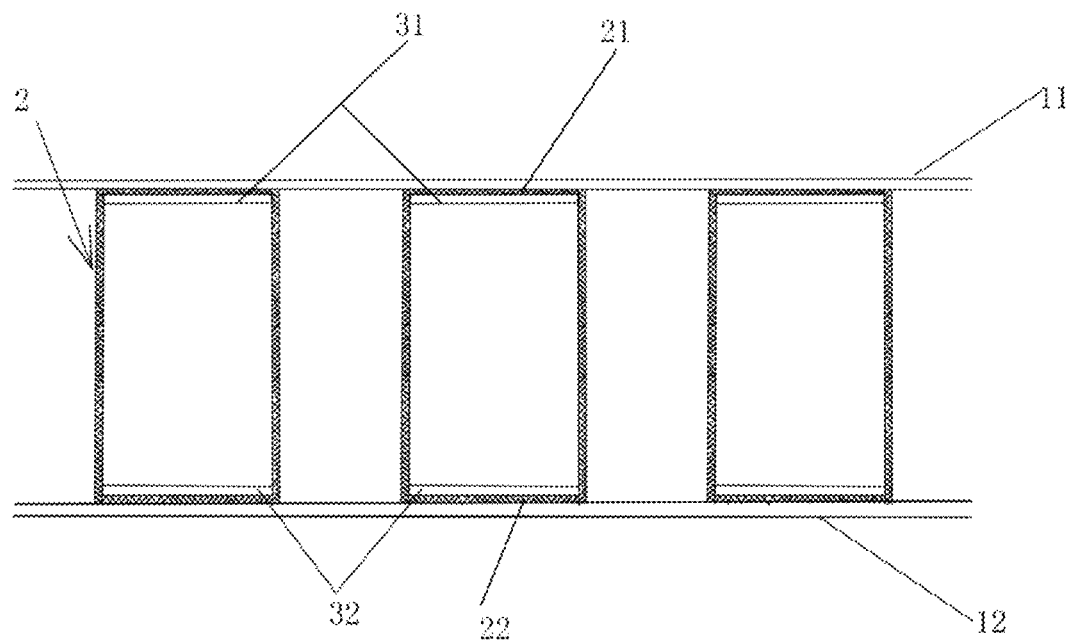
FIG. 3 is a section view of an inflatable product provided in an example of the present invention.
Figure 4:
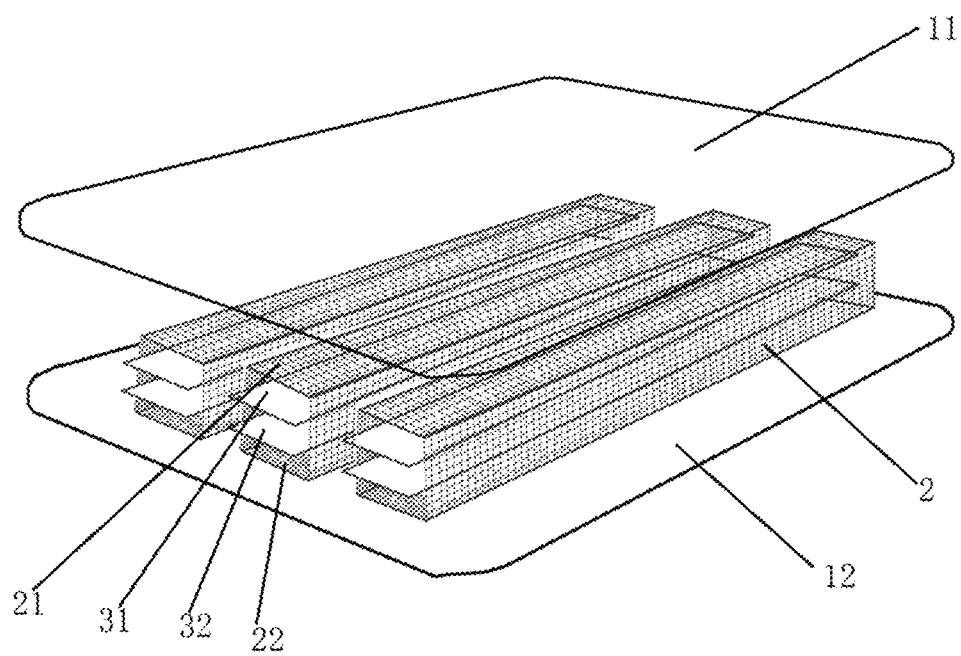
FIG. 4 is a schematic diagram of a layered structure of an inflatable product provided in an example of the present invention.
Figure 5:
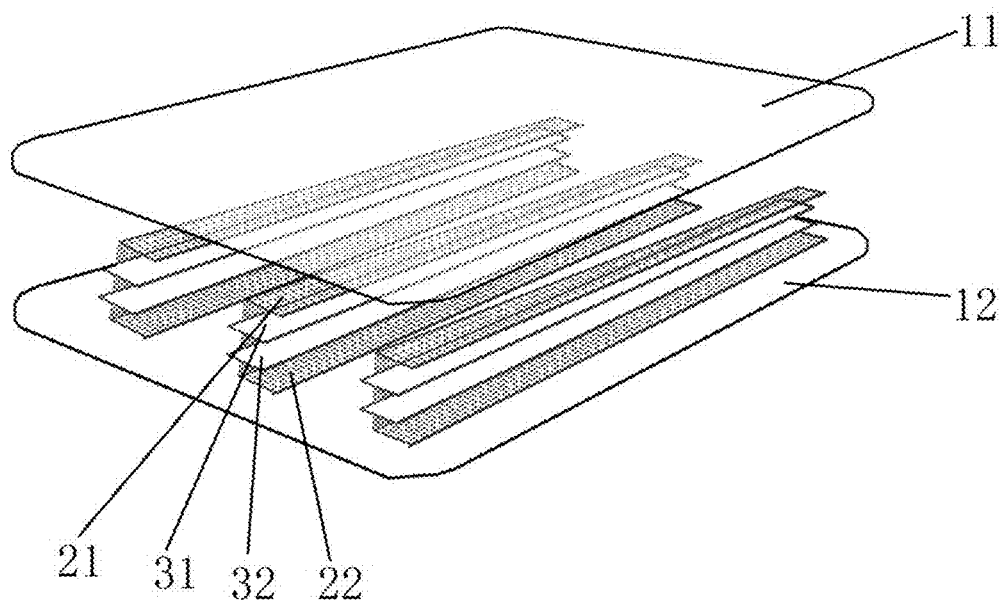
FIG. 5 is a schematic diagram of a layered structure of an inflatable product provided in another example of the present invention.

FIG. 1 is a perspective view of an inflatable product provided in an example of the present invention; FIG. 2 is a perspective view of a pull strap 2 in FIG. 1; FIG. 3 is a section view of an inflatable product provided in an example of the present invention; FIG. 4 is a schematic diagram of a layered structure of an inflatable product provided in an example of the present invention; and FIG. 5 is a schematic diagram of a layered structure of an inflatable product provided in another example of the present invention.

According to one aspect of the present invention, an inflatable product is provided. As shown in FIG. 1 to FIG. 5, the inflatable product comprises: an upper sheet 11, a lower sheet 12, pull straps 2, upper fixing sheets 31 and lower fixing sheets 32, wherein the pull straps 2 are provided between the upper sheet 11 and the lower sheet 12, the pull strap 2 has an upper pull strap sheet 21 and a lower pull strap sheet 22 which are oppositely provided, and the upper pull strap sheet 21 and the lower pull strap sheet 22 are made from a porous material; the upper sheet 11, the upper pull strap sheet 21, the upper fixing sheet 31, the lower fixing sheet 32, the lower pull strap sheet 22 and the lower sheet 12 are successively provided, one face of the upper fixing sheet 31 and one face of the lower fixing sheet 32, which are away from each other, are respectively joined with an inner surface of the upper sheet 11 and an inner surface of the lower sheet 12, and one face of the upper fixing sheet 31 and one face of the lower fixing sheet 32, which face towards each other, are not joined.

The inflatable product provided in the present invention comprises the upper sheet 11, the lower sheet 12, the pull straps 2, the upper fixing sheets 31 and the lower fixing sheets 32, wherein the pull strap 2 has the upper pull strap sheet 21 and the lower pull strap sheet 22 which are oppositely provided, and the upper pull strap sheet 21 and the lower pull strap sheet 22 are made from a porous material, to make the weight of the pull strap 2 very light, so that the weight of the inflatable product is greatly reduced, thus facilitating use. Besides, in the present invention, by providing the upper fixing sheet 31 and the lower fixing sheet 32 in the pull strap 2, wherein one face of the upper fixing sheet 31 and one face of the lower fixing sheet 32, which are away from each other, are respectively joined with the inner surface of the upper sheet 11 and the inner surface of the lower sheet 12, and one face of the upper fixing sheet 31 and one face of the lower fixing sheet 32, which face towards each other, are not joined, when a hot fusing machine or a high-frequency machine is used for processing, the upper pull strap sheet and the upper fixing sheet, and the lower fixing sheet and the lower pull strap sheet can be joined at the same time, that is to say, the inflatable product provided in the present invention can be formed in one step, and no separating sheet needs to be provided in the pull strap 2, thus simplifying the manufacturing process and improving the production efficiency.

In the description of the present invention, the porous material can be various materials having a plurality of pores and suitable for making the pull strap 2, for example, mesh cloth, cotton net and so on. As shown in FIG. 4, the pull strap 2 can be rectangular-shaped. As shown in FIG. 5, the pull strap 2 also can be C-shaped (also called U-shaped).

In order to reduce the weight of the inflatable product, at least parts of the inflatable product joined with the inner surfaces of the upper sheet 11 and the lower sheet 12, i.e. the upper pull strap sheets 21 and the lower pull strap sheets 22, are made from a porous material.

In order to decrease the weight of the pull strap 2 to the greatest extent and further reduce the weight of the inflatable product, preferably, the pull strap 2 is integrally made from a porous material, for example, the pull strap 2 is made from a mesh cloth by sewing.

Figure 6:
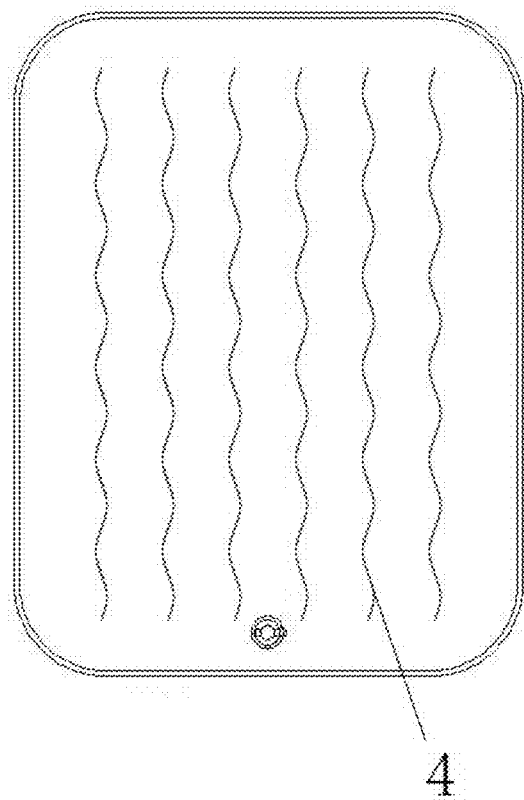
FIG. 6 is a structural schematic diagram of an inflatable product of the present invention using line joining.
Figure 7:
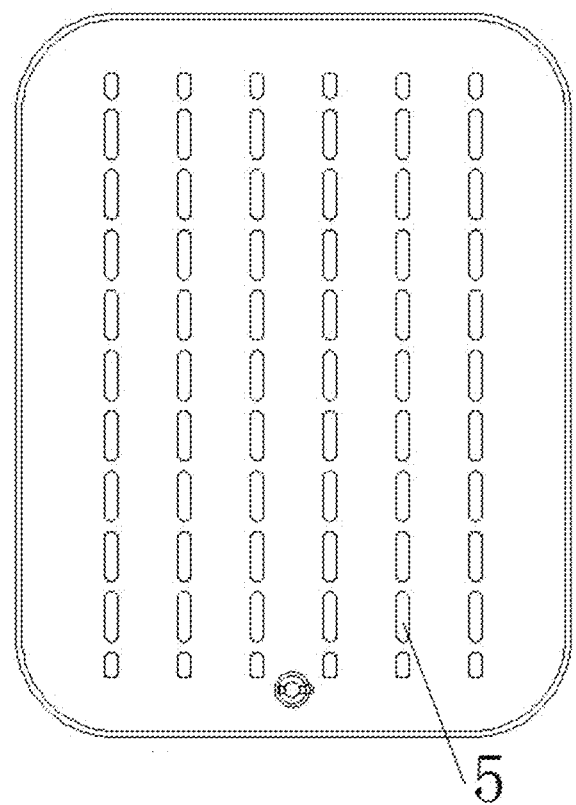
FIG. 7 is a structural schematic diagram of an inflatable product of the present invention using face joining.
Figure 8:
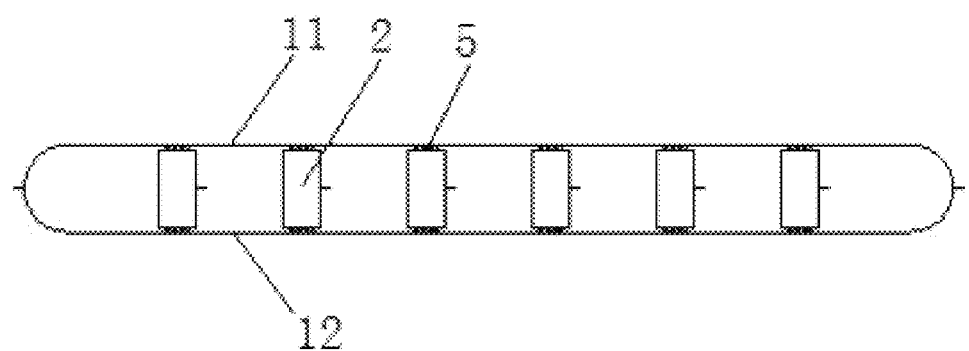
FIG. 8 is a section view of the inflatable product in FIG. 7.
Figure 9:
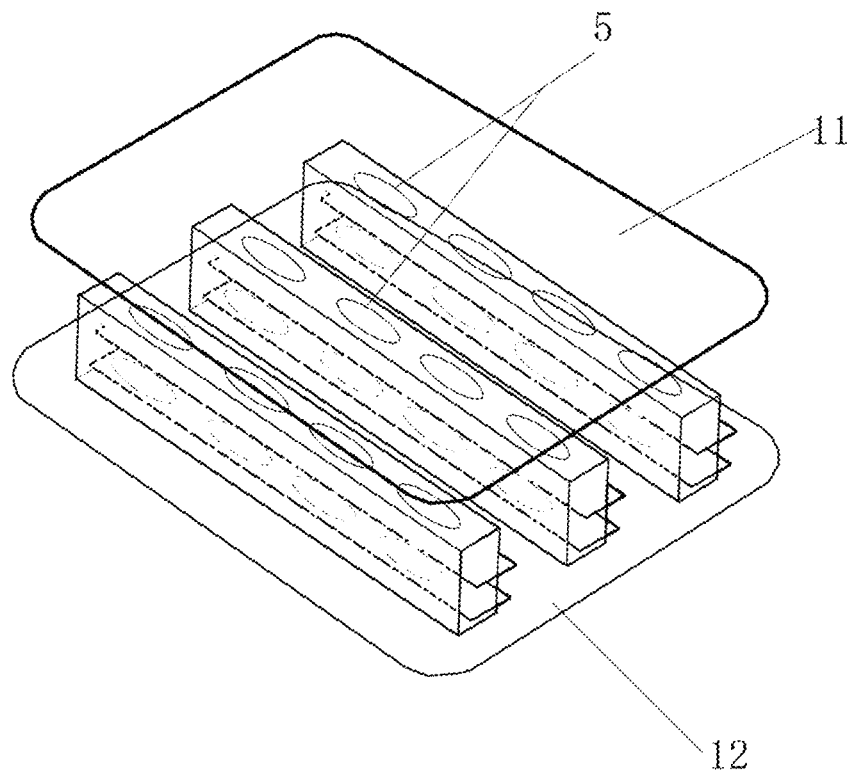
FIG. 9 is a perspective view of an inflatable product of the present invention using face joining.
Figure 10:
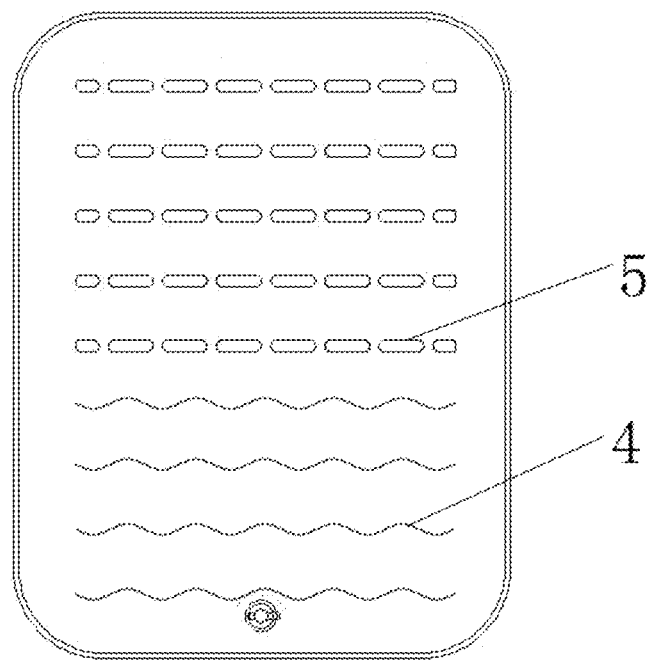
FIG. 10 is a structural schematic diagram of an inflatable product of the present invention using line joining and face joining.

FIG. 6 is a structural schematic diagram of an inflatable product of the present invention using line joining; FIG. 7 is a structural schematic diagram of an inflatable product of the present invention using face joining; FIG. 8 is a section view of the inflatable product in FIG. 7; FIG. 9 is a perspective view of an inflatable product of the present invention using face joining; and FIG. 10 is a structural schematic diagram of and inflatable product of the present invention using line joining and face joining.

As shown in FIG. 6 to FIG. 10, the joining manner between the upper fixing sheet 31 and the inner surface of the upper sheet 11 is point joining, line joining or face joining.

For example, each upper fixing sheet 31 has one or more joining points, and each joining point can firmly join the upper fixing sheet 31 with the inner surface of the upper sheet 11, so as to make the upper pull strap sheet 21 clamped and fixed between the upper sheet 11 and the upper fixing sheet 31. Parts of the upper fixing sheet 31, except the joining points, are not joined with the inner surface of the upper sheet 11.

For another example, as shown in FIG. 6, each upper fixing sheet 31 has one or more joining lines 4, and each joining line 4 can firmly join the upper fixing sheet 31 with the inner surface of the upper sheet 11, so as to make the upper pull strap sheet 21 clamped and fixed between the upper fixing sheet 31 and the inner surface of the upper sheet 11, wherein the joining line 4 can be a straight line or a wavy line. Preferably, the joining line 4 is a wavy line which can avoid generation of local recesses of the upper fixing sheet 31 and can improve the smoothness of the inflatable product. Parts of the upper fixing sheet 31, except the joining lines 4, are not joined with the inner surface of the upper sheet 11. When there are a plurality of joining lines 4 on the upper fixing sheet 31, the plurality of joining lines 4 can all be straight lines, or all be wavy lines, or partially be straight lines and partially be wavy lines.

For another example, as shown in FIG. 7 to FIG. 9, each upper fixing sheet 31 has one or more joining faces 5, and each joining face 5 can firmly join the upper fixing sheet 31 with the inner surface of the upper sheet 11, so as to make the upper pull strap sheet 21 clamped and fixed between the upper fixing sheet 31 and the inner surface of the upper sheet 11. Parts of the upper fixing sheet 31, except the joining faces 5, are not joined with the inner surface of the upper sheet 11, wherein the joining face 5 can be in various suitable shapes such as a rectangular shape, a square shape, a triangular shape, a diamond shape, an elliptical shape, an elongated elliptical shape and so on. When there are a plurality of joining faces 5 on the upper fixing sheet 31, the plurality of joining faces 5 can be combination of one or more selected from a rectangular shape, a square shape, a triangular shape, a diamond shape, an elliptical shape, or an elongated elliptical shape.

Besides, as shown in FIG. 10, the inflatable product further can use a manner of combined line joining and face joining.

Similarly, the joining manner between the lower fixing sheet 32 and the inner surface of the lower sheet 12 is point joining, line joining or face joining.

For example, each lower fixing sheet 32 has one or more joining points, and each joining point can firmly join the lower fixing sheet 32 with the lower sheet 12, so as to make the lower pull strap sheet 22 clamped and fixed between the lower sheet 12 and the lower fixing sheet 32. Parts of the lower fixing sheet 32, except the joining points, are not joined with the inner surface of the lower sheet 12.

For another example as shown in FIG. 6, each lower fixing sheet 32 has one or more joining lines 4, and each joining line 4 can firmly join the lower fixing sheet 32 with the inner surface of the lower sheet 12, so as to make the lower pull strap sheet 22 clamped and fixed between the lower sheet 12 and the lower fixing sheet 32, wherein the joining line 4 can be a straight line or a wavy line. Preferably, the joining line 4 is a wavy line which can avoided generation of local recesses of the lower fixing sheet 32, and can improve the smoothness of the inflatable product. Parts of the lower fixing sheet 32, except the joining lines 4, are not joined with the inner surface of the lower sheet 12. When there are a plurality of joining lines 4 on the lower fixing sheet 32, the plurality of joining lines 4 can all be straight lines, or all be wavy lines, or partially be straight lines and partially be wavy lines.

For another example as shown in FIG. 7 to FIG. 9, each lower fixing sheet 32 has one or more joining faces 5, and each joining face 5 can firmly join the lower fixing sheet 32 with the inner surface of the lower sheet 12, so as to make the lower pull strap sheet 22 clamped and fixed between the lower sheet 12 and the lower fixing sheet 32. Parts of the lower fixing sheet 32, except the joining face 5, are not joined with the inner surface of the lower sheet 12, wherein the joining face 5 can be in various suitable shapes such as a rectangular shape, a square shape, a triangular shape, a diamond shape, an elliptical shape, an elongated elliptical shape and so on. When there are a plurality of joining faces 5 on the lower fixing sheet 32, the plurality of joining faces 5 can be combination of one or more selected from a rectangular shape, a square shape, a triangular shape, a diamond shape, an elliptical shape, or an elongated elliptical shape.

Besides, the joining manner between the upper fixing sheet 31 and the inner surface of the upper sheet 11 is an upper joining manner, and the joining manner between the lower fixing sheet 32 and the inner surface of the lower sheet 12 is a lower joining manner. The upper joining manner can be identical with the lower joining manner, for example, both being point joining, line joining or face joining. The upper joining manner also can be different from the lower joining manner, for example, the upper joining manner is point joining, while the lower joining manner is face joining. A user can choose the joining manner as needed.

Preferably, joining parts (for example, joining points, joining lines 4, joining faces 5) formed between the upper fixing sheet 31 and the inner surface of the upper sheet 11 are uniformly distributed, so that the sealed inflatable chamber, after being inflated, is uniformly stressed.

Generally, when the pull strap 2 is relatively long, a plurality of the upper fixing sheets 31 and a plurality of the lower fixing sheets 32 can be provided in the pull strap 2, reducing the weight, wherein the numbers of the upper fixing sheets 31 and the lower fixing sheets 32 can be set as needed, as long as the upper pull strap sheet 21 and the inner surface of the upper sheet 11 can be fixedly joined.

As shown in FIG. 2, FIG. 4 and FIG. 5, there can be one upper fixing sheet 31 or one lower fixing sheet 32 in each pull strap 2.

Preferably, there are a plurality of the upper fixing sheets 31 and/or the lower fixing sheets 32, and the plurality of the upper fixing sheets 31 and/or the plurality of the lower fixing sheets 32 are arranged at intervals. That is to say, a part between two adjacent upper fixing sheets 31 is not joined with the inner surface of the upper sheet 11, and a part between two adjacent lower fixing sheets 32 is not joined with the inner surface of the lower sheet 12, either. It can be seen thereby that a joining material between two adjacent upper fixing sheets 31 (and lower fixing sheets 32) is omitted in the present example, not only saving the cost, but also reducing the weights of the upper fixing sheets 31 and/or the lower fixing sheets 32, improving ease of use.

Preferably, a plurality of upper fixing sheets 31 are uniformly distributed on the inner surface of the upper sheet 11, and a plurality of lower fixing sheets 32 are uniformly distributed on the inner surface of the lower sheet 12, so as to uniformly clamp the upper pull strap sheets 21 between the upper sheet 11 and the upper fixing sheets 31, thus resulting in uniform support forces of various places of the inflatable product to the upper sheet 11 and/or the lower sheet 12, at the same time, the inflatable product, after being inflated, bears uniform forces everywhere, so as to improve the service life of the inflatable product.

In the above, the upper fixing sheet 31 and the lower fixing sheet 32 can have the same structure, and also can have different structures, as long as one face of the upper fixing sheet 31 and one face of the lower fixing sheet 32, facing towards each other, will not be bonded together when undergoing a hot fusing or high-frequency operation.

Both the upper fixing sheet 31 and the lower fixing sheet 32 can be a single-layer material, for example, when undergoing a hot fusing or high-frequency operation, one face of the upper fixing sheet 31 and one face of the lower fixing sheet 32, facing towards each other, will not be bonded together, but one face of the upper fixing sheet 31 facing towards the upper sheet 11 can be joined with the inner surface of the upper sheet 11, so as to fix the upper pull strap sheet 21 between the upper fixing sheet 31 and the inner surface of the upper sheet 11. One face of the lower fixing sheet 32 facing towards the upper sheet 11 can be joined with the inner surface of the lower sheet 12, so as to fix the lower pull strap sheet 22 between the inner surface of the lower sheet 12 and the lower fixing sheet 32.

Preferably, both the upper fixing sheet 31 and the lower fixing sheet 32 can be a multi-layer material.

For example, in the present example, both the upper fixing sheet 31 and the lower fixing sheet 32 can be a double-layer material. Specifically, the upper fixing sheet 31 and/or the lower fixing sheet 32 comprise a cover layer and a bonding layer fixedly connected on the cover layer. In the above, when undergoing a hot fusing or high-frequency operation, the bonding layer can be joined together with the upper sheet 11 through pores on the upper pull strap sheet 21 (because the upper pull strap sheet 21 is made from a porous material), and the bonding layer tightly clamps the upper pull strap sheet 21 between the upper sheet 11 and the cover layer.

Similarly, when undergoing the hot fusing or high-frequency operation, the bonding layer can be joined together with the inner surface of the lower sheet 12 through pores on the lower pull strap sheet 22 (because the lower pull strap sheet 22 is made from a porous material), and the bonding layer clamps the lower pull strap sheet 22 between the lower sheet 12 and the cover layer.

Specifically, the bonding layer can be of various structures capable of being bonded with the inner surface of the upper sheet 11, and the material of the bonding layer can be various high polymer materials such as TPE (thermoplastic elastomer), TPU (thermoplastic polyurethanes), TPR (thermoplastic-rubber material), TPV (thermoplastic vulcanizate), PVC (polyvinyl chloride), TPO (thermoplastic polyolefin, thimethylbenzoyl-diphenylphosphine oxide), TPVC (polyvinyl chloride thermoplastic elastomer), TPVE (phenyl vinyl ether), EVA (ethylene-vinylacetate copolymer) and the like, which can adhere the upper pull strap sheet 21 with the upper fixing sheet 31, and the lower fixing sheet 32 with the lower pull strap sheet 22 under the hot fusing or high-frequency operation.

The bonding layer further can be a hot melt adhesive film, which is a film product with release paper or without release paper, can conveniently undergo continuous or intermittent operations and can be widely used for bonding of various types of fabrics, papers, high polymer materials and metals.

The bonding layer further can be glue. When the bonding layer is glue, the glue can be directly coated on the cover layer.

Specifically, the material of the cover layer can be a cloth.

Preferably, the upper fixing sheet 31 and/or the lower fixing sheet 32 are/is an adhesive tape. The adhesive tape has a light weight and low cost, moreover, one face of the adhesive tape, which is adhesive, is capable of being joined with the upper sheet 11 or the lower sheet 12, and the other face of the adhesive tape will not be bonded with each other, facilitating use. Specifically, the adhesive tape also comprises a cover layer and a bonding layer, wherein the cover layer is a cloth, and the bonding layer is glue adhered on the cloth.

There may be one or more pull straps 2. The number of the pull strap 2 can be set according to the size of the inflatable product.

Preferably, as shown in FIG. 1 to FIG. 5, FIG. 8 and FIG. 9, there are a plurality of pull straps 2, and the plurality of the pull straps 2 are arranged at intervals.

In the present example, the upper sheet 11 and the lower sheet 12 of the inflatable product are made from a flexible airtight material, and hermetically joined to form a sealed inflatable chamber. The upper sheet 11 and the lower sheet 12 are supported by the flexible airtight material. The flexible airtight material can be a thermoplastic polyurethane compound material, nylon, terylene or oxford cloth.

Preferably, the upper sheet 11 and the lower sheet 12 may be made from a TPU composite fabric, and inner surfaces of the upper sheet 11 and the lower sheet 12 can have an overlay film, which also can be made from a TPU material. The overlay film may have a thickness of 0.01 to 0.5 mm.

In the present invention, the inflatable product further comprises an inflating device and a deflating device, which communicate with the sealed inflating chamber. The sealed inflating chamber is inflated or deflated through the inflating device and the deflating device. The inflating device comprises an inflating valve.

The inflatable product in the present invention can be various suitable products, such as inflating mattresses, inflating beds, inflating sofas, inflating floating rows, inflating pools and so on.

According to the other aspect of the present invention, an inflatable product fusing process is provided. The inflatable product fusing process comprises the following steps:

placing an upper sheet 11 of an inflatable product;

placing pull straps 2 on the upper sheet 11, wherein the pull strap 2 has an upper pull strap sheet 21 and a lower pull strap sheet 22 which are oppositely provided, and the upper pull strap sheet 21 and the lower pull strap sheet 22 are made from a porous material; an upper fixing sheet 31 and a lower fixing sheet 32 are provided between the upper pull strap sheet 21 and the lower pull strap sheet 22, one face of the upper fixing sheet 31 and one face of the lower fixing sheet 32, which are away from each other, are respectively joined with the upper sheet 11 and a lower sheet 12, and one face of the upper fixing sheet 31 and one face of the lower fixing sheet 32, which face towards each other, are not joined;

placing the lower sheet 12 of the inflatable product on the pull straps 2;

performing a hot fusing or high-frequency operation, to fuse the upper pull strap sheets 21 with the upper fixing sheets 31 and the lower fixing sheet s32 with the lower pull strap sheets 22 together at the same time, wherein specifically, the upper pull strap sheet 21 and the upper fixing sheet 31, and the lower fixing sheet 32 and the lower pull strap sheet 22 can be fused together at the same time by using a hot fusing machine or a high-frequency machine.

In the inflatable product fusing process provided in the present invention, the upper fixing sheet 31 and the lower fixing sheet 32 are provided in the pull strap 2, wherein the pull strap 2 has the upper pull strap sheet 21 and the lower pull strap sheet 22 which are oppositely provided, the upper pull strap sheet 21 and the lower pull strap sheet 22 are made from a porous material, making the weight of the pull strap 2 very light, thereby greatly reducing the weight of the inflatable product, thus facilitating use. Besides, in the present invention, the upper fixing sheet 31 and the lower fixing sheet 32 are provided in the pull strap 2, wherein one face of the upper fixing sheet 31 and one face of the lower fixing sheet 32, which are away from each other, are respectively joined with the inner surface of the upper sheet 11 and the inner surface of the lower sheet 12, and one face of the upper fixing sheet 31 and one face of the lower fixing sheet 32, which face towards each other, are not joined. The inflatable product fusing process can join the upper pull strap sheet 21 with the upper fixing sheet 31, and the lower fixing sheet 32 with the lower pull strap sheet 22 at the same time through one hot fusing or high-frequency operation, and no separating sheet needs to be provided in the pull strap 2, thus simplifying the manufacturing process, and improving the production efficiency.

Further, the upper fixing sheet 31 and the lower fixing sheet 32 are placed in a mesh cloth, and then the mesh cloth is folded in half to form an annular pull strap 2. In the present example, firstly the upper fixing sheet 31 and the lower fixing sheet 32 are prepared, and then the upper fixing sheet 31 and the lower fixing sheet 32 are placed in the mesh cloth to manufacture the pull strap 2.

Figure 11:
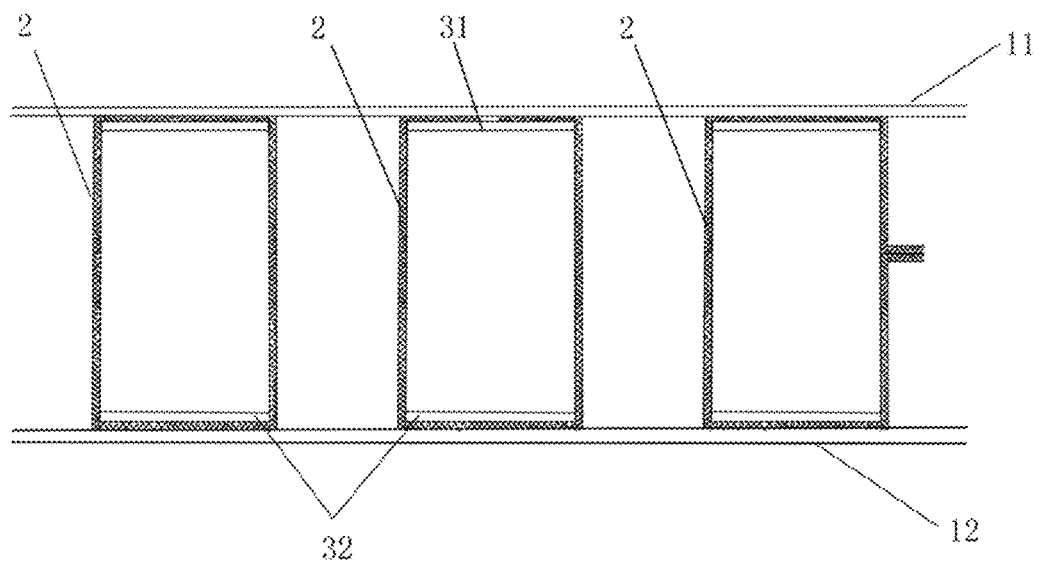
FIG. 11 is a structural schematic diagram of an inflatable product of another example of the present invention.

FIG. 11 is a structural schematic diagram of an inflatable product of another example of the present invention.

As shown in FIG. 11, there are many ways of making the mesh cloth formed into an annular shape, for example, three solutions below.

In the first solution, referring to the pull strap 2 at the left-most side in FIG. 11, a mesh cloth is directly weaved into an annular shape with a suitable size, for example, a square annular shape.

In the second solution, referring to the pull strap 2 in the middle in FIG. 11, a mesh cloth with a suitable width is folded in half, with two sides in the width direction (i.e. left-right direction in FIG. 11) being placed in an area which needs to be fused in practice.

In the third solution, referring to the pull strap 2 at the right-most side of FIG. 11, after a mesh cloth is folded in half, joints (i.e. right joints of the pull strap at the right-most side in FIG. 11) of the mesh cloth are sewn using a machine such as a sewing machine, forming an annular shape.

Further, the mesh cloth, after being folded in half, forms a C-shaped pull strap 2, and then the upper fixing sheet 31 and the lower fixing sheet 32 are placed in the pull strap 2. At this time, the pull strap 2 formed after folding the mesh cloth in half is U-shaped or called C-shaped, that is, the pull strap 2 has an opening, as shown in FIG. 5, and then the upper fixing sheet 31 and the lower fixing sheet 32 are placed in the pull strap 2 through the opening. In the present example, firstly the mesh cloth is folded in half to prepare the pull strap 2, and then the upper fixing sheet 31 and the lower fixing sheet 32 are placed in the pull strap 2.

During operation, the upper sheet 11 and the lower sheet 12 are bonded at edges, where there is neither the mesh cloth, nor the upper fixing sheet 31 or the lower fixing sheet 32, thus the edges of the upper sheet 11 and the lower sheet 12 are joined with each other, forming one sealed inflatable chamber, and the pull straps 2 is located in the sealed inflatable chamber.

It should be indicated that although the inflatable product fusing process provided in the present invention can allow to join the upper pull strap sheet 21 with the upper fixing sheet 31, and the lower fixing sheet 32 with the lower pull strap sheet 22 together at the same time through one-step forming (one hot fusing or one high-frequency operation), users also can choose two-step forming as needed, for example, joining the upper pull strap sheet 21 and the upper fixing sheet 31 together through a first forming, and then joining the lower fixing sheet 32 and the lower pull strap sheet 22 together through a second forming.

Finally, it is to be indicated that: the examples above are used merely to illustrate the technical solutions of the present invention, rather than limiting the invention. While detailed description is made to the present invention with reference to the above-mentioned examples, those ordinarily skilled in the art should understand that the technical solutions recited in the above-mentioned examples still can be modified, or equivalent substitutions can be made to some or all of the technical features thereof; and these modifications or substitutions do not make the essence of the corresponding technical solutions depart from the scope of the technical solutions of the examples of the present invention.

What is claimed is:

1. An inflatable bed, comprising:
    an upper sheet, a lower sheet, annular pull straps, upper fixing sheets, and lower fixing sheets, wherein the annular pull straps are arranged at intervals between the upper sheet and the lower sheet, each annular pull strap has an upper pull strap sheet and a lower pull strap sheet which are provided opposite to one another, and the upper pull strap sheet and the lower pull strap sheet are made from a porous material;
    the upper sheet, the upper pull strap sheet, the upper fixing sheet, the lower fixing sheet, the lower pull strap sheet, and the lower sheet are successively provided in that order, one face of the upper fixing sheet and one face of the lower fixing sheet, which are away from each other, are respectively joined with an inner surface of the upper sheet and an inner surface of the lower sheet, and one face of the upper fixing sheet and one face of the lower fixing sheet, which face towards each other, are free,
    wherein the upper fixing sheet and the upper sheet are joined in a manner of point joining, line joining, or face joining, each upper fixing sheet has one or more joining points, one or more joining lines, or one or more joining faces, and parts of the upper fixing sheet, except the one or more joining points, one or more joining lines, or one or more joining faces, are not joined with the inner surface of the upper sheet; and/or,
    the lower fixing sheet and the lower sheet are joined in a manner of point joining, line joining, or face joining, each lower fixing sheet has one or more joining points, one or more joining lines, or one or more joining faces, and parts of the lower fixing sheet, except the one or more joining points, one or more joining lines, or one or more joining faces, are not joined with the inner surface of the upper sheet; and
    the upper fixing sheet and/or the lower fixing sheet comprises a cover layer and a bonding layer fixedly connected on the cover layer, the bonding layer of the upper fixing sheet and/or the lower fixing sheet is joined together with the upper sheet and/or the lower sheet through pores on the upper pull strap sheet and/or the lower pull strap.

2. The inflatable bed according to claim 1, wherein there are a plurality of the upper fixing sheets and/or the lower fixing sheets, and the plurality of the upper fixing sheets and/or the plurality of the lower fixing sheets are arranged at intervals.

3. The inflatable bed according to claim 1, wherein a material of the bonding layer is TPE, TPU, TPR, TPV, PVC, TPO, TPVC, TPVE, EVA or glue.

4. The inflatable bed according to claim 1, wherein a material of the cover layer is a cloth.

* * * * *